(12) United States Patent
Berndt et al.

(10) Patent No.: US 6,691,886 B1
(45) Date of Patent: Feb. 17, 2004

(54) RESEALABLE PLASTIC PACKAGING CONTAINER WITH HOOK AND LOOP CLOSURE

(75) Inventors: Dieter Berndt, Berlin (DE); Matthias Giebel, Berlin (DE); Christoph Waldau, Berlin (DE); Ulrich Reiners, Venray (DE); Rudi Fux, Eschenburg-Eibelshausen (DE); Roland Karlsson, Marburg (DE)

(73) Assignee: Convenience Food Systems B.V., Bakel (NL)

( * ) Notice: Subject to any disclaimer, the term of this patent is extended or adjusted under 35 U.S.C. 154(b) by 0 days.

(21) Appl. No.: 09/868,269

(22) PCT Filed: Dec. 9, 1999

(86) PCT No.: PCT/EP99/09674
§ 371 (c)(1),
(2), (4) Date: Jul. 13, 2001

(87) PCT Pub. No.: WO00/37334
PCT Pub. Date: Jun. 29, 2000

(30) Foreign Application Priority Data

Dec. 21, 1998 (DE) .......................... 198 59 043

(51) Int. Cl.⁷ .............................. B65D 41/20
(52) U.S. Cl. .................... 220/359.1; 220/315; 220/4.22
(58) Field of Search ......................... 220/359.1, 359.2, 220/359.3, 359.4, 359.5, 377, 315, 810, 833, 835, 4.21, 4.22, 4.23, 4.24, 324; 383/63

(56) References Cited

U.S. PATENT DOCUMENTS

| | | | |
|---|---|---|---|
| 4,848,543 A | | 7/1989 | Doboze |
| 5,092,459 A | * | 3/1992 | Uljanic et al. ........... 200/302.2 |
| 5,480,058 A | * | 1/1996 | Hutchins .................... 206/549 |
| 5,526,935 A | * | 6/1996 | Tidemann et al. .......... 206/713 |
| 5,555,671 A | * | 9/1996 | Voight et al. ................ 206/523 |
| 5,648,136 A | * | 7/1997 | Bird ............................. 206/562 |
| 5,730,294 A | * | 3/1998 | Blosser et al. .............. 206/440 |
| 5,779,084 A | * | 7/1998 | Lehman ....................... 206/508 |
| 6,347,886 B1 | * | 2/2002 | Willemstyn ............ 220/495.11 |

FOREIGN PATENT DOCUMENTS

| | | |
|---|---|---|
| CH | 677 473 | 5/1991 |
| DE | 1 945 575 | 9/1966 |
| DE | 70 21 549 | 9/1970 |
| DE | 71 48 687 | 3/1972 |
| DE | 34 47 875 | 7/1986 |
| DE | 39 25 746 | 2/1991 |
| DE | 39 41 183 | 6/1991 |
| DE | 0 564 695 | 10/1993 |
| EP | 0 379 927 | 8/1990 |
| EP | 0 381 329 | 8/1990 |
| EP | 0 386 490 | 9/1990 |
| EP | 0 385 565 A2 A3 | 9/1990 |
| EP | 0 408 516 | 1/1991 |
| EP | 0 427 512 | 5/1991 |
| EP | 0 427 513 | 5/1991 |
| EP | 0 506 295 | 9/1992 |
| EP | 0 579 262 | 1/1994 |
| EP | 0 595 368 | 5/1994 |
| EP | 0 621 197 | 10/1994 |
| EP | 0 716 986 | 6/1996 |
| FR | 2 568 481 | 2/1986 |
| WO | WO 97/05023 | 2/1997 |

* cited by examiner

Primary Examiner—Lee Young
Assistant Examiner—Niki M. Eloshway
(74) Attorney, Agent, or Firm—Norris McLaughlin & Marcus

(57) ABSTRACT

The invention relates to a resealable plastic packaging container (1) consisting of a tray (2) and a lid film (3) which in the sealing area (4) is sealed to the tray (2) such that it can be at least partly peeled back. The plastic packaging container comprises at least one hook and loop closure (9, 10, 11) whose two complementary parts (9', 10', 11') are arranged opposite each other on the tray (2) and lid film (3), respectively, and by means of which the plastic packaging container can be resealed after the peel-back seal has been opened.

12 Claims, 4 Drawing Sheets

RESEALABLE PLASTIC PACKAGING CONTAINER WITH HOOK AND LOOP CLOSURE

The present invention relates to a resealable plastic packaging container consisting of a packaging tray and a lid film which is sealed to the packaging tray such that it can be at least partly peeled back.

Packaged products, especially foods, are sold increasingly today in plastic packaging containers. These plastic packaging containers have a packaging tray in which the packaged product is situated and a lid film. The lid film is sealed to the packaging tray. As the packaged product often is not immediately consumed after opening, it is advantageous if the packaging container can be resealed after opening.

There has therefore been no lack of attempts in the past to create resealable packaging containers. As examples we need merely mention EP 0,564,695, DE 39 25 746, EP 0,386,490, DE 39 41 183, EP 0,408,516, WO 97/05023, EP 0,716,986, EP 0,595,368, EP 0,579,262, EP 0,506,295, EP 0,427,513, EP 0,427,512, EP 0,385,565, EP 0,381,329 or EP 0,379,927 in which either processes or devices are taught for the production of a resealable packaging container and/or the resealable packaging container itself. All the resealable packaging containers disclosed in the above-mentioned publications have the disadvantage that they are either complicated to produce and/or difficult to reseal.

The object is therefore to provide a resealable plastic packaging container which does not have the disadvantages of the prior art.

According to the invention, said object is achieved by providing a resealable plastic packaging container consisting of a packaging tray and a lid film which in the sealing area is sealed to the packaging tray such that it can be at least partly peeled back and the plastic packaging container has at least one hook and loop closure whose two complementary parts are arranged opposite each another on the packaging tray and on the lid film and by means of which the plastic packaging container can be resealed after the peel-back seal has been opened.

In the meaning of the invention, a packaging tray is any packaging tray familiar to the person skilled in the art which is produced from a thermoplastic and dimensionally stable single- or multi-layer film, preferably as conventionally used for the packaging of foods.

On at least one of its two surfaces the film must have a sealing layer which can be peeled back. Preferably used as the sealing layer is a mixture of LDPE (low-density polyethylene) and a polybutylene. The mixture preferably contains 15 to 30% by weight and especially preferably 20 to 28% by weight polybutylene. The polybutylene preferably has a melt flow index (MFI) ranging from 0.3 to 2.0 g/10 min (190° C. and 216 kg according to ASTM 1238).

It is particularly preferred to produce the packaging tray from a multi-layer film with an expanded carrier film, preferably from an expanded polyolefin film, especially preferably polypropylene film, optionally with a gas barrier layer.

In a particularly preferred fashion, the packaging tray is produced from a film as disclosed in the patent application with the German Patent Office File No. 198 40 046.2. This patent application is hereby incorporated by reference and is thus considered part of the disclosure.

After filling with the product, the thermoformed, preferably deep-drawn packaging trays are sealed with a lid film familiar to the person skilled in the art. Especially suitable as lid films are multi-layer films with a gas barrier layer of ethylene-vinyl alcohol copolymer, preferably consisting of polyethylene terephthalate/-adhesion-promoting layer/ polyethylene/adhesion-promoting layer/ethylene-vinyl alcohol copolymer/adhesion-promoting layer/polyethylene, whereby the polyethylene terephthalate layer can be replaced by polypropylene.

If the lid film of the packaging container according to the invention does not have a recess or elevation, it can also have $SiO_x$ as the gas barrier layer. The lid film is then preferably composed of $PET/SiO_x$/adhesion-promoting layer/polyethylene.

Such lid films are distinguished by their especially good transparency and a high resistance to breakage when folded. The package packaging tray sealed in this way has an especially good gas barrier effect.

According to the invention, the lid film is sealed in the sealing area to the packaging tray such that the lid film can at least be partly peeled back. For the peel-back seal, the lid film is sealed to the packaging tray at a temperature of 130° C. to 150° C., and at a pressure of $3 \times 10^5$ to $8 \times 10^5$ $N/m^2$, preferably $4.0 \times 10^5$ to $5.0 \times 10^5$ $N/m^2$. If the packaging containers according to the invention are to have a non-peelback, i.e. permanently sealed, part of the sealing area, the permanent seal is preferably executed at an least 10° C. higher temperature than the peel-back seal and at preferably double the pressure. A permanent seal in the meaning of the invention is a seal whereby the force required to detach the lid film must be at least five times higher than in the area of the peel-back seal.

The sealing area on the packaging tray is preferably situated on a horizontal plane above the packaged product and preferably extends on this plane around the entire packaged product. On a polygonal plastic packaging container, the lid film can be permanently sealed to the packaging tray on preferably at least one side of this polygon whereas the lid film in the remaining sealing area is peelably sealed to the packaging tray. On a round packaging container, preferably 5 to 25% of the sealing area can be provided with a permanent seal.

According to the invention, the resealable plastic package has at least one hook and loop closure by means of which the plastic packaging container can be resealed after the peel-back seal has been opened. The hook and loop closure can be any hook and loop closure familiar to the person skilled in the art in any desired form. Such a hook and loop closure consists of two complementary parts which engage and thus form a firm but releasable joint. The two complementary parts of the hook and loop closure are arranged opposite each another on the packaging tray and on the lid film respectively. After the packaging container has been opened, it can be sealed again by pressing the part of the hook and loop closure arranged on the lid against the part of the hook and loop closure arranged on the packaging tray.

The hook and loop closure can be joined to the lid film or packaging tray in any desired manner familiar to the person skilled in the art. However, it is preferably sealed on, or attached by hotmelt adhesive, and very especially preferably bonded.

The hook and loop closure is preferably made of polypropylene.

In a preferred embodiment, the hook and loop closure is arranged outside the sealing area or is at least arranged at a position where the seal can be peeled back.

In an especially preferred embodiment of the plastic packaging container according to the invention, the lid film has at least one elevation and the packaging tray at least one complementary recess which are arranged opposite each other and on each of which one part of the hook and loop closure is arranged.

In an equally especially preferred embodiment of the plastic packaging container according to the invention, the lid film has at least one recess and the packaging tray at least one complementary elevation which are arranged opposite each other and on each of which one part of the hook and loop closure is arranged.

In another preferred embodiment, either the lid film or the packaging tray has a recess in each of which one complementary part of the hook and loop closure is arranged.

However, it is also possible to arrange the complementary parts of the hook and loop closure without recess or elevation on the lid film and packaging tray.

If a permanent sealing area is provided, the hook and loop closure(s) is/are arranged on the plastic packaging container such that they are arranged outside the area of the permanent seal and preferably diametrically opposite. The advantage of this arrangement is that the lid film can then be tensioned and then firmly yet re-releasably connected with the hook and loop closure(s).

The plastic packaging container according to the invention can preferably have additional means, e.g. opening aids and/or means for resealing the packaging container. Such means are preferably a zip-fastener as disclosed in EP 0 621 197 A1, a lip seal, a clip seal as disclosed in EP 0 427 512, or a knob as disclosed in the parallel application with the internal File No. CH 8007. These publications and the parallel application are hereby incoporated by reference and are thus part of the disclosure.

Foods, preferably solid, e.g. fresh or cooked meat products, are preferably packaged in the packaging container according to the invention.

With the plastic packaging container according to the invention it is possible to reseal an opened packaging container firmly yet re-releasably. The packaging container is easy for the user to seal and open. The plastic packaging container is simple and inexpensive to produce.

In the following the invention is explained with reference to FIGS. 1 to 4. This is merely an explanation by way of example and thus does not limit the inventive idea.

Figure 1:
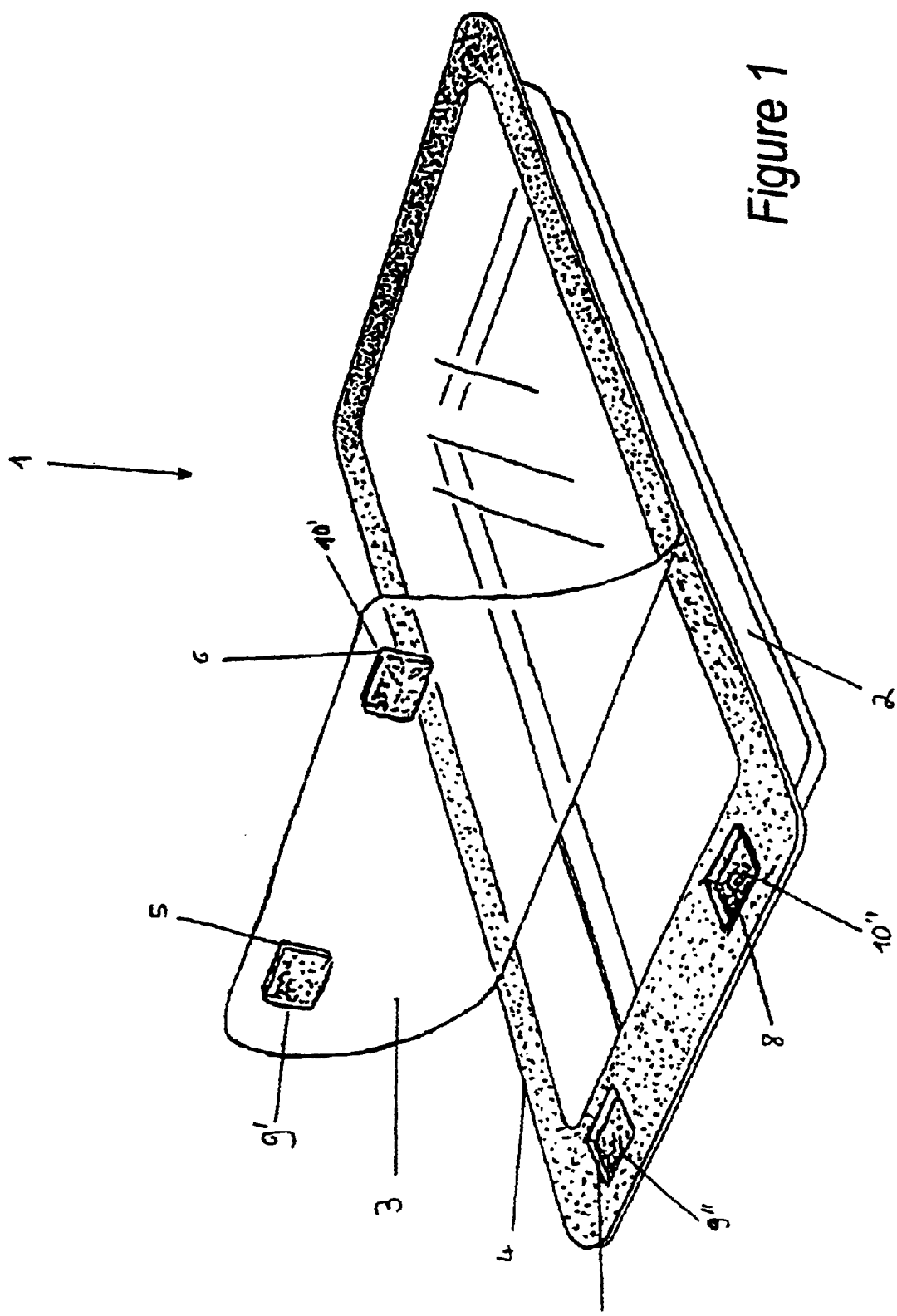
FIG. 1 shows a plastic packaging container according to the invention with the sealing parts of the hook and loop closures arranged in recesses and on elevations.

FIG. 1 shows a plastic packaging container 1 according to the invention consisting of a packaging tray 2 and a lid film 3. The packaging container has a sealing area 4 which is horizontal and extends around the entire packaging tray 2. In this sealing area 4 the lid film 3 is sealed to the packaging tray 2 whereby the lid film is peelably sealed to the packaging tray in the sparsely dotted portion of the sealing area 4 whereas it is permanently sealed to the packaging tray in the densely dotted portion of the sealing area 4. When opened, the lid film is only lifted from the packaging tray on three sides and remains joined to the packaging tray in the portion of permanent sealing. The lid film, a gas-tight polyethylene terephthalate (PET)/EVOH/PE/PB film, has two elevations 5, 6 and the packaging tray two complementary recesses 7, 8 which are arranged exactly opposite the elevations so that the elevations can be inserted into the recesses. Arranged on the elevations and in the recesses are the respective complementary parts 9', 9", 10', 10" of two hook and loop closures which have an edge length of 1×1 cm. The hook and loop closures are arranged in the sealing area of the plastic packaging container. The person skilled in the art recognizes that the hook and loop closures can also be arranged at other positions in the sealing area and that further hook and loop closures in the sealing area in addition to the two illustrated can be present.

After the lid film has been opened, the packaging container is resealed by pressing the complementary parts of the hook and loop closures together.

Figure 2:
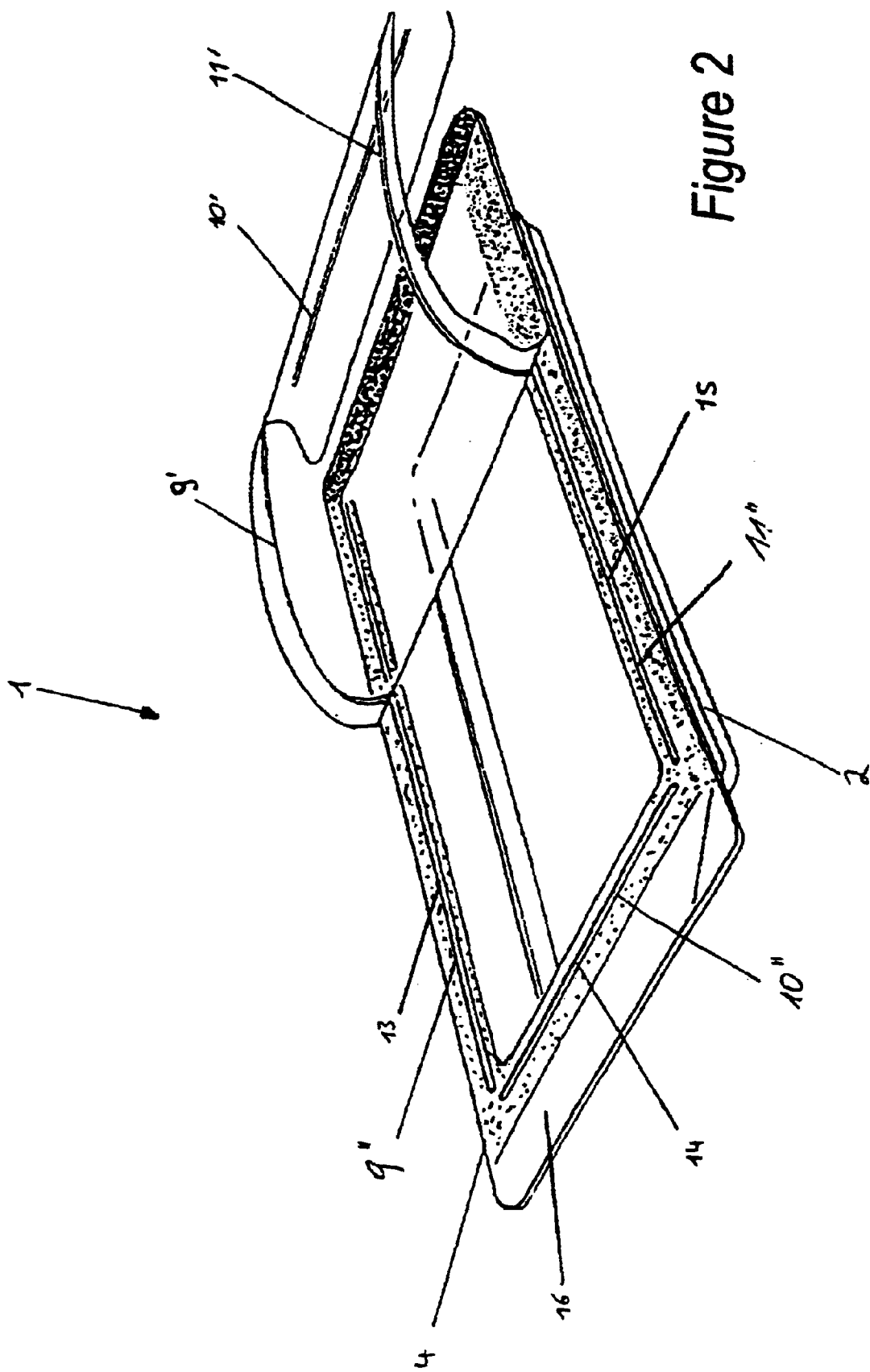
FIG. 2 shows a plastic packaging container according to the invention with one sealing part of the hook and loop closures arranged in recesses.

FIG. 2 also shows a plastic packaging container 1 according to the invention consisting of a packaging tray 2 and a lid film 3. The packaging container has a sealing area 4 which is horizontal and extends around the entire packaging tray 2. In this sealing area 4 the lid film 3 is sealed to the packaging tray 2 whereby the lid film is peelably sealed to the packaging tray in the sparsely dotted portion of the sealing area 4 whereas it is permanently sealed to the packaging tray in the densely dotted portion of the sealing area 4. When opened, the lid film is only lifted from the packaging tray on three sides and remains joined to the packaging tray in the portion of permanent sealing. Narrow strips of one closure element 9', 10', 11' of the hook and loop closure 9, 10, 11 are bonded to the lid film, a flexible PET film. The packaging tray, on the other hand, has recesses 13, 14, 15 which are arranged directly opposite the strips 9', 10', 11' of the hook and loop closure 9, 10, 11. The recesses 13, 14, 15 contain the complementary parts 9", 10", 11" of the hook and loop closures (not illustrated). When the lid film is closed, the closure elements 9', 10', 11' of the hook and loop closures are pressed into the recesses 13, 14, 15 and engage there with the complementary parts 9", 10", 11".

In the front area 16 the plastic packaging container has an area where the lid film is not sealed to the packaging tray so that it is easier for the consumer to peel back the lid film.

The person skilled in the art also recognizes that further resealing means, e.g. zip-fasteners, lip seals and/or clip seals, can be provided instead of the hook and loop closures 9, 10, 11.

Figure 3:
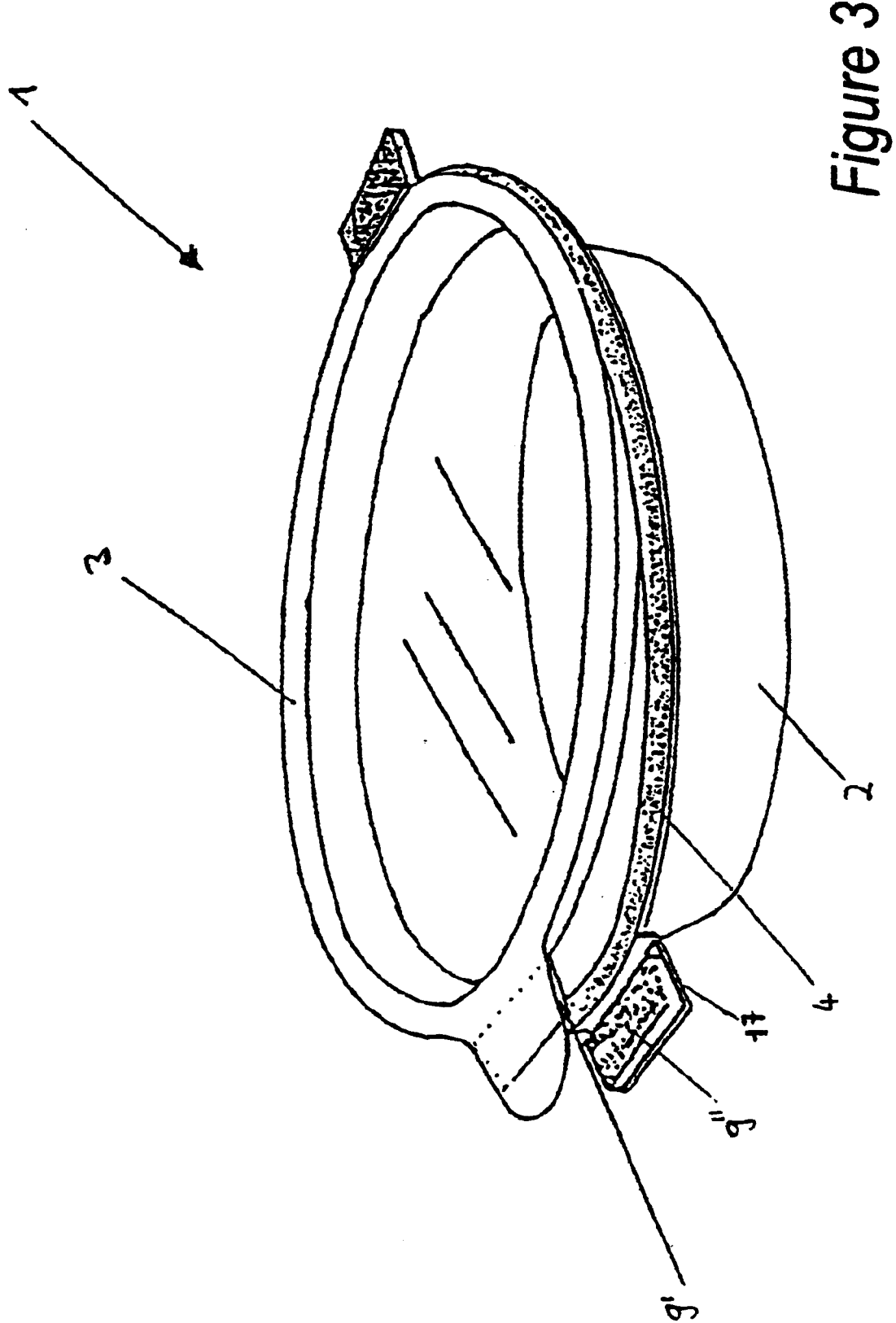
FIG. 3 shows a plastic packaging container according to the invention on which the hook and loop closure is arranged outside the sealing area and which has an opening aid.

FIG. 3 shows a resealable plastic packaging container 1 consisting of a packaging tray 2 and a lid film 3. The packaging container has a sealing area 4 which is horizontal and extends around the entire packaging tray 2. In this sealing area 4 the lid film 3 is sealed to the packaging tray 2 whereby the lid film is peelably sealed to the packaging tray in the sparsely dotted area whereas it is permanently sealed to the packaging tray in the densely dotted area. When opened the lid film is lifted from the packaging tray and remains joined to the packaging tray only in the densely dotted area. A part 9' of the hook and loop closure 9 is bonded beneath the opening aid to the lid film, a rigid PET-PE film. The complementary part 9" of the hook and loop closure 9 is bonded to a small tab 17 of the packaging tray.

Figure 4:
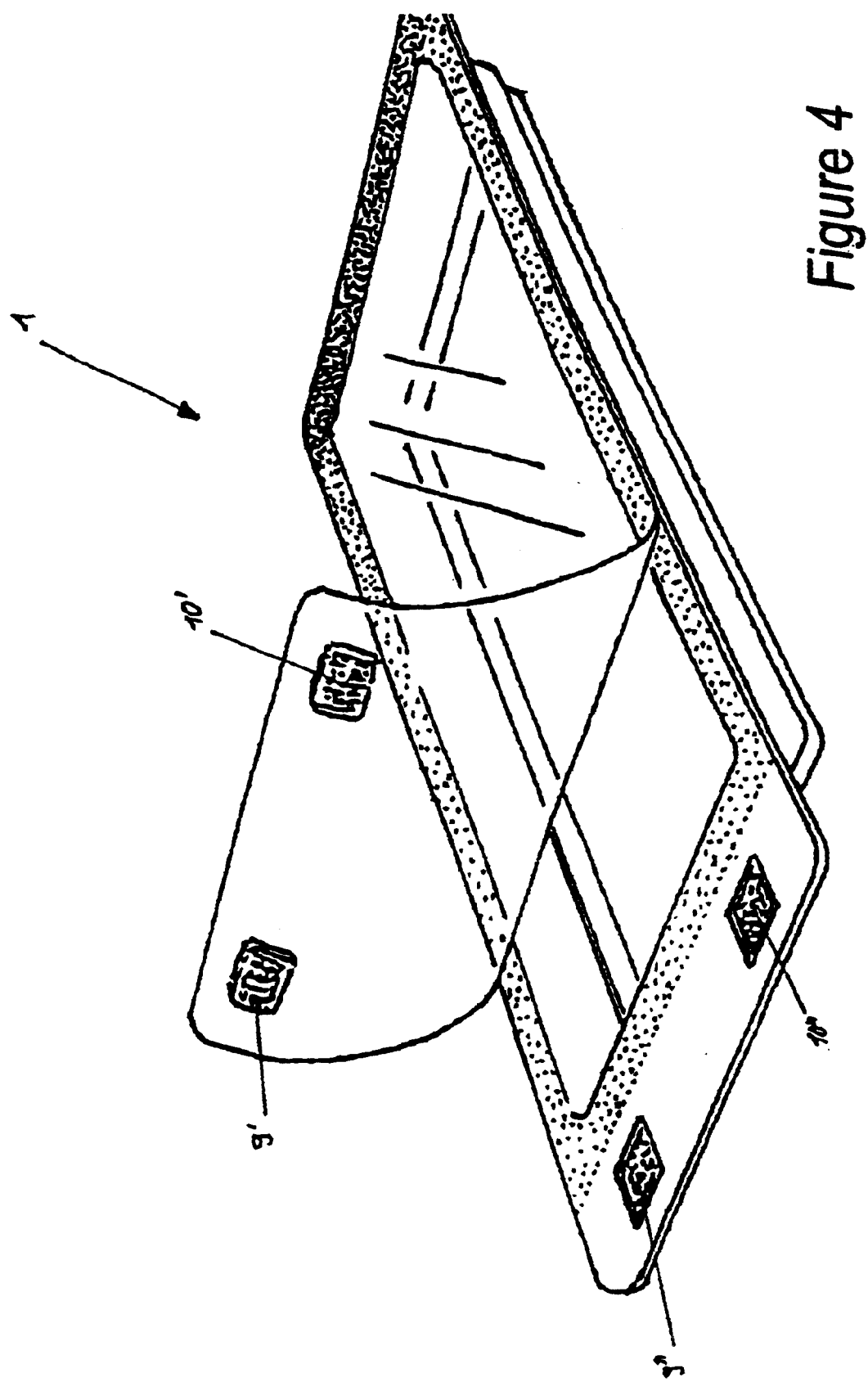
FIG. 4 shows a plastic packaging container according to the invention with the hook and loop closure arranged outside the sealing area.

FIG. 4 shows the plastic packaging container according to FIG. 1, except that in this case the complementary closure parts 9', 9", 10', 10" of two hook and loop closures 9, 10 are arranged outside the sealing area and are located in recesses and on elevations of the packaging tray and lid film.

What is claimed is:

1. A resealable plastic packaging container comprising a packaging tray and a lid film which in a sealing area of the packaging container is sealed to the packaging tray such that it can be at least partly peeled back, wherein the plastic container has at least one hook and loop closure whose complementary parts are arranged opposite each other on the packaging tray and lid film and by means of which the plastic packaging container can be resealed after opening, and wherein the lid film has at least one elevation and the packaging tray at least one complementary recess which are arranged opposite each other in the sealing area and on or in each of which a closure element of the hook and loop closure is arranged.

2. A resealable plastic packaging container comprising a packaging tray and a lid film which in a sealing area is sealed to the packaging tray such that it can be at least partly peeled back, wherein the plastic packaging container has at least one hook and loop closure whose complementary parts are arranged opposite each other on the packaging tray and lid film and by means of which the plastic packaging container can be resealed after opening, and wherein the lid film has at least one recess and the packaging tray at least one complementary elevation which are arranged opposite each other in the sealing area and on or in each of which a closure element of the hook and loop closure is arranged.

3. The resealable plastic packaging container according to claim 1 or 2, wherein the hook and loop closure or closures is or are arranged outside the sealing area.

4. The resealable plastic packaging container according to claim 1 or 2, wherein the hook and loop closure or closures is or are arranged in the area of the peel-back seal.

5. A resealable plastic packaging container comprising a packaging tray and a lid film which in a sealing area is sealed to the packaging tray such that it can be at least partly peeled back, wherein the plastic packaging container has at least one hook and loop closure whose complementary parts are arranged opposite each other in the sealing area on the packaging tray and lid film and by means of which the plastic packaging container can be resealed after opening, and wherein the lid film or the packaging tray has at least one recess and one closure element of the hook and loop closure each time is arranged in the recess and the respective complementary part of the hook and loop closure is at the level of the sealing plane.

6. The resealable plastic packaging container according to claim 1, 2 or 5, wherein 5 to 25% of the sealing area has a permanent seal.

7. The resealable plastic packaging container according to claim 6, wherein the hook and loop closure or closures and the area of permanent sealing are diametrically opposite each other.

8. The resealable plastic packaging container according to claim 1, 2 or 5, wherein the complementary closure elements of the hook and loop closure are each firmly bonded to the lid film and to the pack aging tray.

9. The resealable plastic packaging container according to claim 1, 2 or 5, further comprising at least one additional means for resealing the packaging container.

10. The resealable plastic packaging container according to claim 9, wherein said means is a zip-fastener, lip seal, clip seal or combination thereof.

11. The resealable plastic packaging container according to claim 1, 2 or 5, wherein the packaging tray is made of an optionally multi-layer film with an expanded backing film as base film and optionally with a gas barrier layer.

12. The resealable plastic packaging container according to claim 1, 2 or 5, wherein the lid film is constituted of a thermoformable film of polyethylene terephthalate or polyproylene with an ethylene-vinyl alcohol copolymer gas barrier layer and polyethylene, and the packaging tray is constituted of an expanded polypropylene film as backing film.

* * * * *

UNITED STATES PATENT AND TRADEMARK OFFICE
CERTIFICATE OF CORRECTION

PATENT NO. : 6,691,886 B1
DATED : February 17, 2004
INVENTOR(S) : Berndt et al.

It is certified that error appears in the above-identified patent and that said Letters Patent is hereby corrected as shown below:

Column 6,
Line 17, "pack aging" should read -- packaging --

Signed and Sealed this

Twenty-first Day of December, 2004

JON W. DUDAS
*Director of the United States Patent and Trademark Office*